United States Patent [19]

Swaroop et al.

[11] Patent Number: 4,992,233
[45] Date of Patent: Feb. 12, 1991

[54] SINTERING METAL POWDERS INTO STRUCTURES WITHOUT SINTERING AIDS

[75] Inventors: Srinivas H. Swaroop, Corning; Raja R. Wusirika, Painted Post, both of N.Y.

[73] Assignee: Corning Incorporated, New York, N.Y.

[21] Appl. No.: 219,986

[22] Filed: Jul. 15, 1988

[51] Int. Cl.$^5$ ................................................ B22F 1/00
[52] U.S. Cl. .......................................... 419/2; 419/36; 419/37; 419/57; 419/58
[58] Field of Search .................... 419/36, 2, 37, 57, 58; 75/245, 246, 249

[56] References Cited

U.S. PATENT DOCUMENTS

| | | | |
|---|---|---|---|
| 2,220,641 | 6/1936 | Davis | 210/205 |
| 2,554,343 | 5/1951 | Pall | 210/205 |
| 3,444,925 | 5/1969 | Johnson | 165/166 |
| 3,788,486 | 1/1974 | Bergstrom | 210/496 |
| 3,997,341 | 12/1976 | Janowski et al. | 75/211 |
| 4,273,582 | 6/1981 | Gutjahar et al. | 75/222 |
| 4,488,820 | 11/1984 | Schelb | 419/28 |
| 4,554,130 | 11/1985 | Ecev | 419/8 |
| 4,582,677 | 4/1986 | Sugino et al. | 419/2 |
| 4,615,863 | 10/1986 | Inoue et al. | 419/23 |

FOREIGN PATENT DOCUMENTS 0038558 10/1981 European Pat. Off.
1495705 12/1977 United Kingdom.

OTHER PUBLICATIONS

Lee et al., Intl. J. Powder Met. & Powder Tech., vol. 21, No. 1, 1985, 9–21.
Sheasby, Intl. J. Powder Met. & Powder Tech., vol. 15, No. 4, 1979, 301–305.

*Primary Examiner*—Stephen J. Lechert, Jr.
*Assistant Examiner*—Nina Bhat
*Attorney, Agent, or Firm*—Richard N. Wardell

[57] ABSTRACT

Sintering metal powder in inert and/or reducing atmosphere has been found to result in a hard porous metal structure without the use of sintering aids. The oxidation resistance of the structure can be enhanced by the firing process comprised of the following steps: oxidation, reduction, and then inert gas sintering.

7 Claims, No Drawings

Page 1
SINTERING METAL POWDERS INTO STRUCTURES WITHOUT SINTERING AIDS

BACKGROUND OF THE INVENTION

This invention relates to the sintering of metal powders into structures without the use of sintering aids. Metal powders, in particular aluminum and iron powders, have been difficult to sinter into porous structures due to the oxidation of the metals into their more highly oxidized states.

In U.S. Pat. No. 4,758,272 ('272) to be issued July 19, 1988 (on application Ser. No. 07/054,845), which is herein incorporated by reference, sintering of aluminum-iron alloys are disclosed. In the '272 patent the presence of a small amount of sintering aid was found necessary, such as an alkaline earth metal, to act as a getter for oxygen. Aluminum-iron alloys in the presence of oxygen forms a durable aluminum oxide layer and a not so durable iron oxide layer which inhibits the sintering of the metal powder into a hard porous body.

The present invention solves the sintering problems associated with aluminum powder and/or its iron powder alloy, and the subsequent oxide formations that may form in these bodies under sintering conditions. It has been found by sintering in a controlled atmosphere that aluminum powder and/or its iron powder alloys may produce hard porous bodies that do not require a sintering aid.

SUMMARY OF THE INVENTION

The invention, herein, discloses a structure comprised of sinterable metal powders wherein the metal powders are batched, formed, dried, oxidized, reduced, and sintered in the absence of sintering aids, whereby said metal powders are sintered into a hard porous sintered body. The invention may also include a structure comprised of sinterable metal powders wherein the metal powders are first oxidized, then reduced, and finally sintered in an inert atmosphere whereby oxidation resistant a hard porous body is formed.

The present invention combines alloys of aluminum and iron powder, mixes these alloys with organic binders and water, and sinters the resultant body in an inert or reducing environment, such as argon or hydrogen, to form a hard porous metal body. The resultant metal structure is comprised of aluminum and iron. As analyzed, the structure may have contaminant levels of alkaline earth metals present. However, the presence of alkaline earth metals are incidental to sintering the body according to this invention, and when contaminant free aluminum-iron alloys are sintered by this method, hard porous metal bodies result, which are alkaline earth free.

The composition of the bodies contemplated in the present invention consist essentially, as analyzed in L weight percent, of 5–50% Al, 30–90% Fe, the sum Al and Fe constituting at least 80% of the total composition, 0–10% Sn, 0–10% Cu, 0–10% Cr, the sum Sn and Cu and Cr being no more than 20%, which can be sintered into a body form without the presence of a sintering aid.

Additionally, metals such as nickel, niobium, steel, titanium, and various alloys of those metals with one another or with other metals such as are present in stainless steels and rare earth metals are contemplated as within the scope of the invention as are the combinations therebetween and combinations thereof. All these metals may be advantageously sintered without the use of sintering aids, in an inert and/or reducing sintering environment.

The body of the invention in the batched form is formable, moldable and extrudable. The unsintered body can be formed into slabs, honeycombs, and assorted geometries for sintering. The body of the invention can then be effectively used as a catalyst support for internal combustion engines, filter (such as a diesel particulate filter), or any other use where a high surface area, hard porous body can be effective.

A method of sintering a structure comprised of sinterable metal powders in the absence of sintering aids comprising the steps of: (a) mixing metal powders and organic binder and forming a green body of the resultant mixture, (b) burning the binder out of said body in an oxidizing atmosphere, (c) reducing the oxidized body in a reducing atmosphere, and (d) densifying said reduced body into the structure.

Exclusion of oxygen, or at least the consumption of oxygen by certain more competitive oxygen acceptor than aluminum, from the sintering environment is required to form the hard porous bodies of the aluminum-iron alloy contemplated in the present invention. The exclusion of oxygen is accomplished by excluding oxygen from the firing means and then optionally by charging the environment with inert and/or reducing gases. Therefore, a method of sintering a structure of sinterable metal powders in the absence of sintering aids comprising sintering said structure in an nonoxidizing environment is contemplated. It has been convenient to combine both inert gases, such as argon, and reducing gases, such as hydrogen, in a 50/50 mixture. The combination of such gases can extend from 100% inert gas to 100% reducing gas producing a sintered hard porous body.

An additional consideration, in order to produce oxidation resistant hard porous bodies, is to incorporate within the sintering method a means to reduce any oxide layer that may have formed on the metal constituents of the body.

In a preferred embodiment of the invention, and to produce a sintered hard porous body which is oxidation resistant after sintering, a three step process is contemplated. After the aluminum-iron powder is mixed with the organic binder and water, the mixture is mulled, extruded (formed), and subsequently fired to burn out the organic binder, thus giving the body resultant porosity. At this point, however, some of the metal, such as the exposed surfaces of aluminum and/or iron, may have oxidized. So that densification can be optimized, an oxide reduction step is performed between the binder burnout and densification. Simply stated, the oxide reduction step fires the body in a reducing atmosphere, such as hydrogen, to chemically reduce any oxide layer present on the metal. Preferably the oxygen content of the metal is reduced to at least about 1% by weight thereof.

The reduced body is then densified in an inert or reducing atmosphere. Those skilled in the art can appreciate that densification may be conveniently combined into the oxidation reduction step with relative ease.

The most preferred embodiment of the inventive process for sintering an iron aluminide without the use of a sintering aid is as with the following controlled atmospheres:

(1) The body is fired at approximately 500° C. to attain very low carbon levels (from 0.03 to 0.08 weight percent). This firing is done in air (or oxidizing conditions). Iron in the alloy becomes highly oxidized.

(2) To remove any oxide formed during binder burn out and before densification, the body is fired in a hydrogen atmosphere at about 600° to 650° C. The goal in this reduction is to reduce the body to about a 1% by weight oxide content. A favored atmosphere is a 50/50 mixture of hydrogen and argon, mostly for safety considerations. A potential benefit to this particular step is the activation of the reduced iron surfaces to bonding with other metals or to iron itself which has been reduced during this step. The benefit accorded the body is enhancement of sintering and better metal-metal bond formation.

(3) Densification, therefore becomes the final step in the process of the most preferred embodiment. The body is fired from between approximately 1275° and 1400° C. The atmosphere should be inert and/or reducing, such as 100% argon, up to 50% argon and 50% hydrogen, or 100% hydrogen. Other inert gases or reducing gases may be advantageously employed with the same results, producing a sintered hard porous, oxidation resistant body.

Several methods of using the invention are contemplated such as, specifically, without intended limitation, a method of filtering using a structure comprised of sinterable metal powders wherein the metal powders are sintered without the addition of sintering aids to produce a hard porous body whereby said body is placed in the exhaust path of a diesel engine. Additionally, a method of catalyzing using a structure comprised of sinterable metal powders wherein the metal powders are sintered without the addition of sintering aids to produce a hard porous body whereby said body is placed in the exhaust path of an internal combustion engine.

Alterations of the firing atmosphere and temperature may be variously construed by those skilled in the art, however, it is important that the amount of oxygen present must be metered so that it does not interfere with the sintering of the body.

DESCRIPTION OF THE PREFERRED EMBODIMENTS

The following examples are presented to show how the invention may be worked and are not meant to limit the invention to any specific embodiment.

EXAMPLE 1

In Example 1, 72 weight percent iron powder (Hoeganaes MH300) and 28 weight percent iron-aluminum alloy powder (50/50 iron-aluminum alloy, Shieldalloy) with a diameter of less than 45 microns were dry blended in a high intensity dry blender. The dry blender was equipped with chopper blades, such as a Littleford mixer, for 3 minutes. 1.0 weight percent oleic acid (as wetting agent) was added, with mixing continuing for an additional 2 minutes. Next, 6.0 weight percent methylcellulose (as binder), 0.5 weight percent zinc stearate (as lubricant), and 1.0 weight percent zinc powder were added to blend the mixture. Then enough water was added to blend the mixture into a batch. The batch was plasticized in a muller or a twin blade mixer, such as a Brabender Platicorder mixing head, for approximately 20 minutes. The plasticized batch was extruded in a piston extruder. The batch was further homogenized and deaired by passing the batch through a spaghetti or noodle die. The batch was then extruded into a honeycomb structure.

The honeycomb was dried in an oven at 90-120° C. for a minimum of 8 hours to remove water. The honeycomb was then fired at 500° C in mildly recirculating air for 6 hours, coming up to temperature slowly (20° C./hr) between 250° to 500° C. to burn the binder out. To reduce the iron oxides formed, the honeycomb was fired at 650° C. in a continuous flow $H_2$ furnace for 6 hours, with slow heating (20° C./hr) between 250° to 650° C. The honeycomb was then sintered at 1300° C. for 4 hours in a continuous flow of inert gas, argon in this instance.

EXAMPLE 2

In Example 2, 66 weight percent iron powder was dry mixed with 34 weight percent 50/50 iron-aluminum powdered alloy. The body was then batched, extruded, fired, and sintered as in Example 1. The resultant honeycomb comprised 17 weight percent aluminum.

EXAMPLE 3

In Example 3, 60 weight percent iron powder was dry mixed with 40 weight percent of a 50/50 iron-aluminum powdered alloy. As in Example 1, the body was then batched, extruded, fired, and sintered. The resultant honeycomb comprised 20 weight percent aluminum.

EXAMPLE 4

In Example 4, 54 weight percent iron powder was dry mixed with 46 weight percent of a 50/50 iron-aluminum powdered alloy. As in Example 1, the body was then batched, extruded, fired, and sintered. The resultant honeycomb comprised 23 weight percent aluminum.

It can be appreciated by those skilled in the art that the sintering and firing conditions can be varied to achieve different sintered and fired bodies. As contemplated in the present invention, sintered bodies without the use of sintering aids are achieved by firing and sintering in inert or reducing atmospheres. The most preferred embodiment is not just a sintered metal structure, but a sintered metal structure which is oxidation resistant.

To achieve a sintered body with an oxidation resistant body the most preferred method is to fire and sinter the structure as in Example 1. It is contemplated, however, that a sintered body may be obtained by merely sintering the structure between 1275° and 1400° C. for 0.5 to 4 hours.

Additionally, to obtain an oxidation resistant structure the firing temperature may be varied from 600° to 900° C. The mixture of inert gas and reducing gas may contain the entire range of 0-100% for either inert or reducing gas and achieve acceptable oxidation resistant structures. Those skilled in the art will appreciate that an inert environment can mean a vacuum environment.

It was discovered in the process of excluding oxygen, that other techniques, besides the use of calcium and magnesium, could be advantageously employed. These processes included: burying the structure in fine alumina powder, in coarse alumina powder, placing the structure on a zirconia plate, burying the structure in zirconia beads, and by suspending the structure in a tapered alumina crucible. It can be appreciated that simply excluding oxygen from the sintering atmosphere is the preferred method for commercialization.

It was found that the different firing processes resulted in different properties in the fired structures. For instance, when samples were fired without an oxidation step, the samples contained, to be considered preferred, too much residual carbon which reduced the oxidation resistance of the structure. Only when the structure was oxidatively fired, then reductively fired, and subsequently sintered in an inert environment was the structure shown to exhibit high oxidation resistance and good sintering properties. Residual carbon concentrations less than 0.1 weight percent are the most preferred. Firing entirely in 100% hydrogen would not provide a most preferred structure with less than 0.1 weight percent carbon.

We claim:

1. A method of producing an oxidation resistant, hard, porous, sintered body of sinterable metal powder consisting essentially, as analyzed in weight percent, of 5-50% Al, 30-90% Fe, the sum of Al and Fe constituting at least 80% of the total powers, 0-10% Ns, 0-10% Cu, 0-10% Cr, the sum of Sn and Cu and Cr being no more than 20%, in the absence of sintering aids, which method comprises the sequential steps of:

(a) wet mixing the metal powder with organic binder and forming a green body of the resultant mixture,
(b) firing said green body in an oxidizing atmosphere to burn out said binder with some of said metal being consequentially oxidized,
(c) firing said green body in a reducing atmosphere to reduce said oxidized metal, and
(d) firing said green body in a nonoxidizing environment to sinter said metal powder and density said green body into said porous, sintered body.

2. The method in claim 1 wherein the oxidizing atmosphere is air.

3. The method in claim 1 wherein the reducing atmosphere is a mixture of argon gas and hydrogen gas.

4. The method in claim 1 wherein the reducing atmosphere is 100% hydrogen.

5. The method of claim 1 wherein the nonoxidizing environment is gas selected from argon, hydrogen, and a combination thereof.

6. The method of claim 1 wherein the step of firing in a reducing atmosphere is carried out at a temperature below the sintering temperature to reduce the oxygen content of the metal to at least about 1% by weight thereof, and the step of firing in a nonoxidizing environment is carried out at the sintering temperature.

7. The method of claim 1 wherein the step of forming a green body is the extrusion of a honeycomb.

* * * * *

UNITED STATES PATENT AND TRADEMARK OFFICE
CERTIFICATE OF CORRECTION

PATENT NO. : 4,992,233

DATED : February 12, 1991

INVENTOR(S) : Srinivas H. Swaroop, Raja R. Wusirika

It is certified that error appears in the above-identified patent and that said Letters Patent is hereby corrected as shown below:

On the title page:
  In the Abstract, line 2, "sphere" should read --spheres--.

Column 4, line 9, "formed," should read --formed--.

Column 5, line 24:
  Claim 1, line 5, "Ns" should read --Sn--.

Column 5, line 9:
  Claim 1, line 17, "density" should read --densify--.

Signed and Sealed this

Third Day of November, 1992

Attest:

DOUGLAS B. COMER

Attesting Officer

Acting Commissioner of Patents and Trademarks